United States Patent [19]

Takada et al.

[11] Patent Number: 5,010,787
[45] Date of Patent: Apr. 30, 1991

[54] HYDRAULIC CONTROL DEVICE FOR AUTOMATIC TRANSMISSION FOR VEHICLE ADAPTED TO ENGAGE CLUTCH AT DIFFERENT SPEED ACCORDING TO ENGINE OUTPUT POWER

[75] Inventors: Mitsuru Takada; Hiroshi Itoh, both of Toyota; Tokuyuki Takahashi, Aichi; Makoto Funahashi, Toyota, all of Japan

[73] Assignee: Toyota Jidosha Kabushiki Kaisha, Toyota, Japan

[21] Appl. No.: 388,488

[22] Filed: Aug. 2, 1989

[30] Foreign Application Priority Data

Aug. 2, 1988 [JP] Japan .................................. 63-192965
Sep. 12, 1988 [JP] Japan .................................. 63-228269
Feb. 6, 1989 [JP] Japan .................................. 1-27243

[51] Int. Cl.$^5$ ............................................. B60K 41/16
[52] U.S. Cl. ...................................................... 74/867
[58] Field of Search .......................... 74/867, 868, 877

[56] References Cited

U.S. PATENT DOCUMENTS

| | | | |
|---|---|---|---|
| 4,030,381 | 6/1977 | Lalin et al. | 74/867 |
| 4,036,083 | 7/1977 | McQuinn | 74/867 |
| 4,446,759 | 5/1984 | McCrary | 74/867 |
| 4,476,747 | 10/1984 | Kawamoto | 74/868 |
| 4,532,829 | 8/1985 | Sugano | 74/867 |
| 4,697,479 | 10/1987 | Hayakawa et al. | 74/867 |
| 4,858,501 | 8/1989 | King | 74/868 |

Primary Examiner—Dirk Wright
Attorney, Agent, or Firm—Oblon, Spivak, McClelland, Maier & Neustadt

[57] ABSTRACT

In an automatic transmission for a vehicle such as an automobile having a speed stage shifting mechanism including parallelly arranged first and second hydraulically operated input clutches and adapted to provide the 3rd speed stage in which the first and second input clutches $C_1$ and $C_2$ are both engaged (though the engagement of the clutch $C_1$ in the 3rd speed stage is not essential unless engine brake availability is required) and the overdrive 4th stage in which the clutch $C_1$ is disengaged and the clutch $C_2$ is engaged, the clutch $C_1$ in the 3rd speed stage being not essential unless engine a hydraulic control device has a switching over valve 330 for switching over supply of a hydraulic pressure to the first clutch $C_1$ between a first mode of relatively slowing supplying the hydraulic pressure to the first clutch $C_1$ and a second mode of relatively quickly supplying the hydraulic pressure to the first clutch $C_1$ according to engine output power so as to select the second mode when engine output power is higher than a determinate power level as in the downshifting by kickdown and to select the first mode when engine output power is less than the determinate power level as in the overdrive inhibition.

6 Claims, 8 Drawing Sheets

| RANGE | SPEED STAGE | | FIRST SOLENOID (400) | SECOND SOLENOID (410) | THIRD SOLENOID (420) | C1 (38) | C2 (40) | C3 (42) | C4 (44) | B1 (46) | B2 (48) | F1 (34) | F2 (36) | REMARKS |
|---|---|---|---|---|---|---|---|---|---|---|---|---|---|---|
| R | ALLOWED | | | | | | | O | | | O | | | |
|  | INHIBITED | | | | O | | | | | | | | | ABOVE A PREDETERMINED SPEED |
| D | 1st | | O | | | O | | | | | | | O | |
|  | 2nd | | O | O | | O | | | | | | O | O | |
|  | 3rd | | | | O | O | | | O | | | | | |
|  | 4th | | | O | O | | O | | O | | | | | |
| S | 1st | | O | | | O | | | | | | O | O | |
|  | 2nd | | O | | | O | | | O | O | | | | |
|  | 3rd | | | O | | O | O | | O | | | | | |
|  | (3rd) | | | | | O | ⊙ | | ⊙ | | | ⊙ | | WHEN SOLENOID VALVE FAILED |
| L | 1st | | ⊙ | | | ⊙ | ⊙ | | ⊙ | ⊙ | ⊙ | | ⊙ | |
|  | 2nd | | ⊙ | O | | | | | ⊙ | ⊙ | | | ⊙ | |
|  | (2nd) | | | | | ⊙ | ⊙ | | | | | | ⊙ | WHEN SOLENOID VALVE FAILED |

HYDRAULIC CONTROL DEVICE FOR AUTOMATIC TRANSMISSION FOR VEHICLE ADAPTED TO ENGAGE CLUTCH AT DIFFERENT SPEED ACCORDING TO ENGINE OUTPUT POWER

BACKGROUND OF THE INVENTION

1. Field of the Invention

The present invention relates to a hydraulic control device for an automatic transmission for a vehicle such as an automobile, and more particularly, to a hydraulic control device for such an automatic transmission having two parallelly arranged input clutches which are selectively engaged or disengaged in providing a plurality of speed stages.

2. Description of the Related Art

In Japanese Patent Application No. 62-195471 filed on Aug. 5, 1987 and laid open to public on Feb. 13, 1989, two of the inventors of the present invention have proposed an automatic transmission for a vehicle such as an automobile in which a speed stage shifting mechanism includes two parallelly arranged input clutches and is adapted so that a first one of the two input clutches is engaged when it provides a first speed stage, a second speed stage and a third speed stage, whereas a second one of the two input clutches is engaged when it provides the third speed stage and a fourth speed stage. In such a speed stage shifting mechanism the engagement of said first input clutch (in fact clutch $C_1$ described hereinunder) is not essential, however, for setting up said third speed stage, if no engine brake availability is required, by a provision of a one way clutch in parellel with said first input clutch, said one way clutch being adapted to be automatically engaged when the automatic transmission operates in a normal engine driving condition. For setting up said second speed stage in which said second input clutch is disengaged, the engagement of said first input clutch is essential.

In such an automatic transmission, assuming that the vehicle is running with the automatic transmission being set up in the fourth speed stage, there are two possibilites for the transmission being shifted down from the fourth speed stage to the third speed stage. In a first possibility, the automatic transmission is shifted down from the fourth speed stage to the third speed stage by a stepping down of the accelerator pedal, that is, the so-called kickdown, and in a second possibility the transmission is shifted down from the fourth speed stage to the third speed stage by the prohibition of the overdrive stage, provided that the fourth speed stage is an overdrive stage as mostly so in the modern automobiles and there is provided an overdrive selection means such as an overdrive cutoff button.

When the transmission is shifted down from the fourth speed stage to the third speed stage in the above-mentioned type automatic transmission, it is desired that, when the downshifting is due to the kickdown, said first input clutch is engaged relatively slowly as compared in the downshifting due to the overdrive prohibition, or in other words, when the downshifting is due to the overdrive prohibition, said first clutch is engaged relatively quickly as compared in the downshifting due to the kickdown, because, when the automatic transmission is shifted down from the fourth speed stage to the third speed stage by the kickdown, after a reaction brake (in fact brake $B_1$ described hereinunder) was disengaged, engine rotational speed rises and the above-mentioned one way clutch (in fact one way clutch $F_1$ described hereinunder) is automatically put into engagement, and therefore said first clutch may be slowly engaged or rather should be slowly engaged not to cause an abrupt engine braking, while in the downshifting due to the overdrive prohibition, since the accelerator pedal will not be stepped on, engine rotational speed will not rise so that said one way clutch is swiftly engaged, and therefore, if the engagement of the first clutch is delayed, the vehicle will run in an inertial condition as if it is running with the manual shift lever set to the neutral position. Such an inertial running condition, when it occurs without a positive instruction by the drive, will give the driver a feeling of danger of loss of engine braking.

Further, when the transmission is shifted down from the fourth speed stage to the second speed stage by a deeper depression of the accelerator pedal, it is now essential that said first clutch is engaged to operate the transmission since said second clutch is now disengaged, and in this case said first clutch should be engaged quickly.

Thus, it is noted that in the automatic transmission of the above-mentioned type the speed of engagement of said first clutch should be variably controlled according to the stepping on condition of the accelerator pedal or, more fundamentally, the output power of the engine.

In order to control the engagement speed of said first input clutch in accordance with the stepping on condition of the accelerator pedal, it is considered to operate a switching over valve in the hydraulic control system based upon the so-called throttled pressure which is well known in the hydraulic control system of the automatic transmission for a vehicle such as an automobile as a hydraulic pressure generated by a pressure modulating valve which modulates a source hydraulic pressure generally available as the so-called line pressure in the hydraulic control system according to a mechanical displacement of a valve spool element representing the stepping on movement of the accelerator pedal. However, the throttle pressure is generally designed to correspond to engine output power in as a wide range thereof as possible, and therefore the rate of increase or decrease of the throttle pressure relative to increase or decrease of engine output power is generally too small in a region of small engine output power. In other words, as viewed in a diagram showing the pressure level of the throttle pressure along an ordinate relative to throttle opening along an abscissa, the inclination of a curve of the throttle pressure is too small to faithfully simulate engine output power in a region of low throttle opening.

SUMMARY OF THE INVENTION

Therefore, it is a primary object of the present invention to provide a hydraulic control device for an automatic transmission for a vehicle such as an automobile including a speed stage shifting mechanism of the above-mentioned type in which the engagement speed of said first input clutch is variably controlled in accordance with stepping on condition of the accelerator pedal or engine output power.

A secondly object of the present invention is to provide a hydraulic control device which accomplishes the above-mentioned primary object at high accuracy in accrodance with stepping down condition of the accelerator pedal or engine output power corresponding thereto.

According to the present invention, the above-mentioned primary object is accomplished, for an automatic transmission for a vehicle such as an automobile having a speed stage shifting mechanism including parallelly arranged first and second hydraulically operated input clutches and adapted to provide a certain first speed stage in which said first and second input clutches are both engaged and a certain second speed stage higher than said first speed stage in which said input clutch is disengaged and said input clutch is engaged, the engagement of said input clutch in said first speed stage being not essential unless engine brake availability is required, a hydraulic control device comprising a switching over valve variably operable according to an input signal representing engine output power so as to switch over supply of a hydraulic pressure to said first input clutch between a, first mode of relatively slowly supplying said hydraulic pressure, to said first input clutch and a second mode of relatively quickly supplying said hydraulic pressure to said first input clutch according to whether engine output power is higher than a determinate power level or less than said determinate power lever, respectively.

Further, said secondary object is more appropriately accomplished by the hydraulic control device of the above-mentioned construction further comprising an engine simulation valve for modulating a line hydraulic pressure available in said hydraulic control device in accordance with a throttle hydraulic pressure available in said hydraulic control device so as to generate an engine power simulation hydraulic pressure which increases or decreases at higher rate along with increase or decrease of said throttle hydraulic pressure than said line hydraulic pressure in a low pressure level region of said throttle hydraulic pressure including a certain pressure level of said throttle hydraulic pressure corresponding to said determinate power level of engine output power, said determinate power level of engine output power being determined base upon said engine power simulation hydraulic pressure.

In the hydraulic control device of the above-mentioned construction said second speed stage may be an overdrive stage, and said automatic transmission may be shifted down from said first stage to said first speed stage according to said first mode when said overdrive stage is inhibited.

Further, in the hydraulic control device of the above-mentioned construction said automatic transmission may be shifted down from said second speed stage to said first speed stage according to said second mode by kickdown.

BRIEF DESCRIPTION OF THE DRAWINGS

In the accompanying drawings.

DESCRIPTION OF THE PREFERRED EMBODIMENT

In the following the invention will be described in detail with respect to a preferred embodiment thereof with reference to the accompanying drawings.

Figure 1:
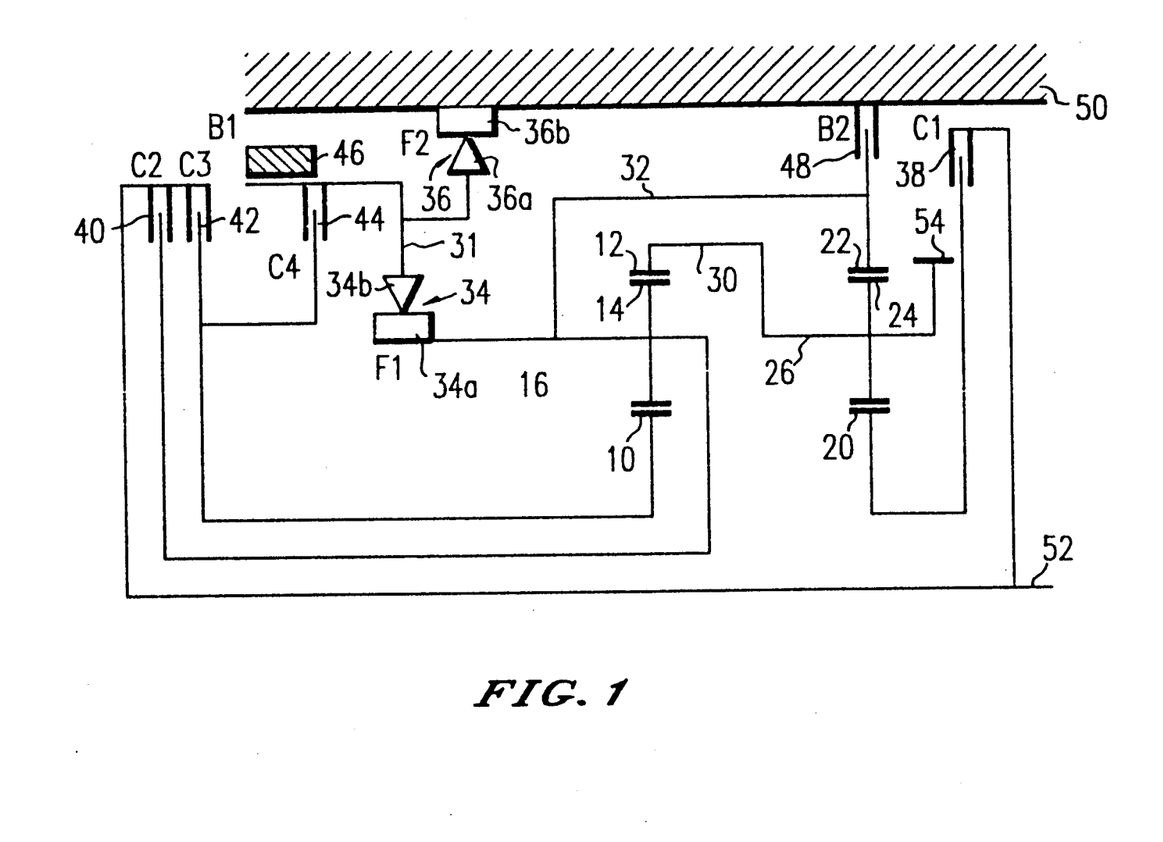
FIG. 1 is a schematic illustration of a planetary gear type speed change device for an automatic transmission having substantially the same speed shift gear mechanism as that disclosed in the above-mentioned Japanese patent application to which the hydraulic control device according to the present invention is applicable.

Referring to FIG. 1, the speed stage shifting mechanism herein shown comprises a first planetary gear mechanism having a first sun gear 10, a first ring gear 12 coaxial with said first sun gear 10, a first planetary pinion 14 meshing with said first sun gear 10 and said first ring gear 12, and a first carrier 16 rotatably supporting said first planetary pinion 14, and a second planetary gear mechanism having a second sun gear 20, a second ring gear 22 coaxial with said second sun gear 20, a second planetary pinion 24 meshing with said second sun gear 20 and said second ring gear 22, and a second carrier 26 rotatably supporting said second planetary pinion 24. The first ring gear 12 is connected with the second carrier 26 by a connecting member 30. The first carrier 16 is connected with the second ring gear 22 by a connecting member 32.

A first one way clutch 34 and a second one way clutch 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch which also has an outer race 36b connected with the housing 50. The first one way clutch 34 is engaged when the outer race 34b would rotate relative to the inner race 34a in a first rotational direction and slips when the inner race 34a rotates relative to the outer race 34b in a second direction opposite to said first direction. Similarly, the second one way clutch 36 is engaged when the inner race 36a would rotate relative to the outer race 36b in said first direction and slips when the inner race 36a rotates relative to the outer 36a in said second direction.

The second carrier 26 is connected with an annular gear member 54 which operates as an output rotational member of this speed stage shifting mechanism.

A first clutch 38 is provided between the second sun gear 20 and an input shaft 52 for selectively connecting these two members with one another. A second clutch 40 is provided between the first carrier 16 and the input shaft 52 for selectively connecting these two members with one another. A third clutch 42 is provided between the first sun gear 10 and the input shaft 52 for selectively connecting these two members with one another. A fourth clutch 44 is provided between the first sun gear 10 and the connecting member 31 for selectively connecting the sun gear 10 with the outer race 34b of the one way clutch 34 and the inner race 36b of the one way clutch 36.

A first brake 46 is provided between the connecting member 31 and the housing 50 for selectively fixing the connecting member 31 relative to the housing 50. A second brake 48 is provided between the combination of the second ring gear 22 and the first carrier 16 and the housing 50 for selectively fixing the second ring gear 22 and the first carrier 16 with respect to the housing 50.

Figure 2:
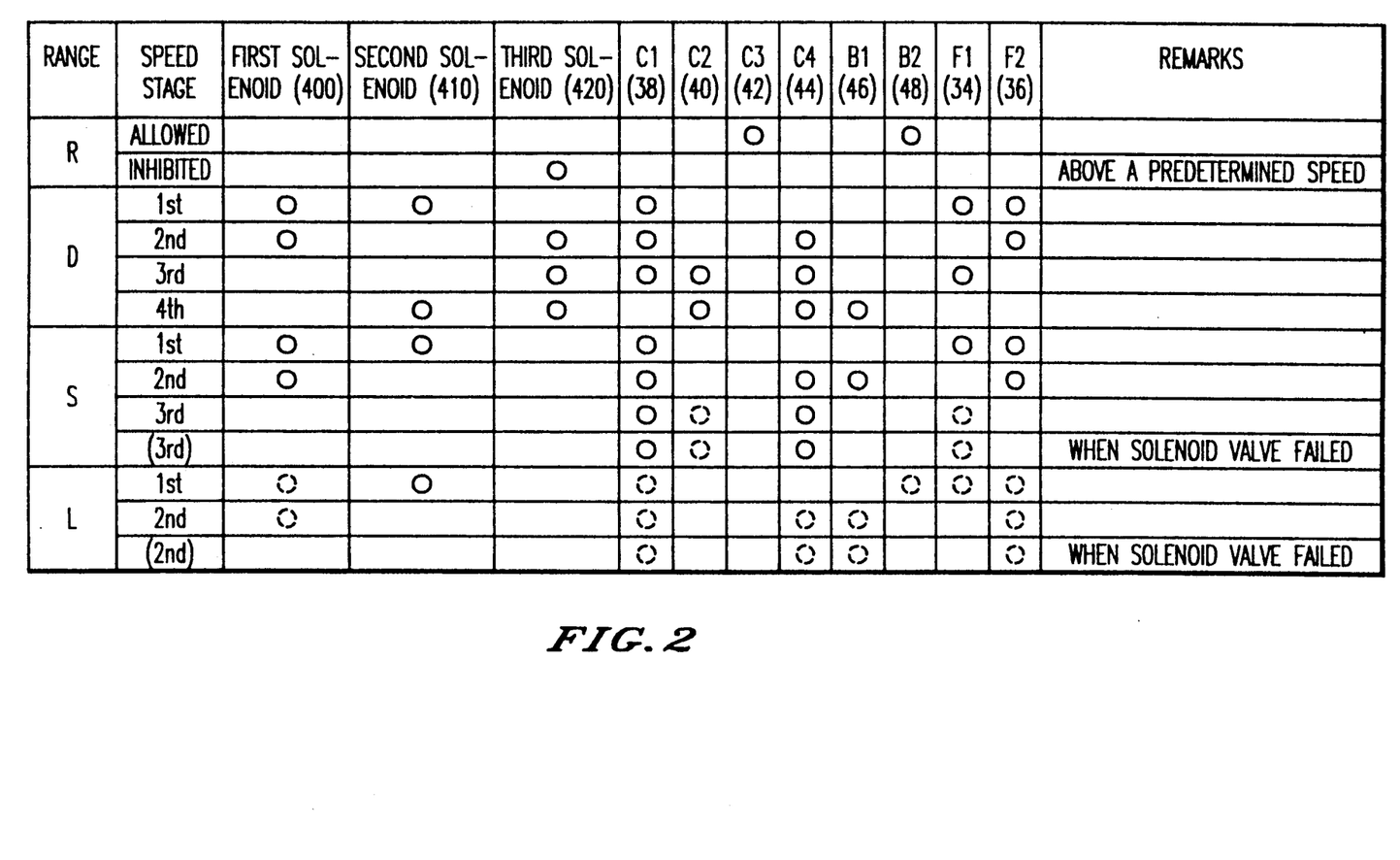
FIG. 2 is a table showing combinations of energization of the solenoid valves and engagement of the clutches and brakes for setting up the respective speed stages.

The manner of providing a first speed stage, a second speed stage, a third speed stage (direct connection stage), a fourth speed stage (overdrive stage) and a reverse stage is shown in Table 1 and FIG. 2. In Table 1 and FIG. 2 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage with the effect of engine braking.

When the ratio of the number of gear teeth of the ring gear 12 to that of the first sun gear 10 is $r_1$, and the ratio of the number of gear teeth of the second ring gear 22 to that of the second sun gear 20 is $r_2$, speed change gear ratios at the respective speed stages are as shown in Table 2.

Figure 3A:
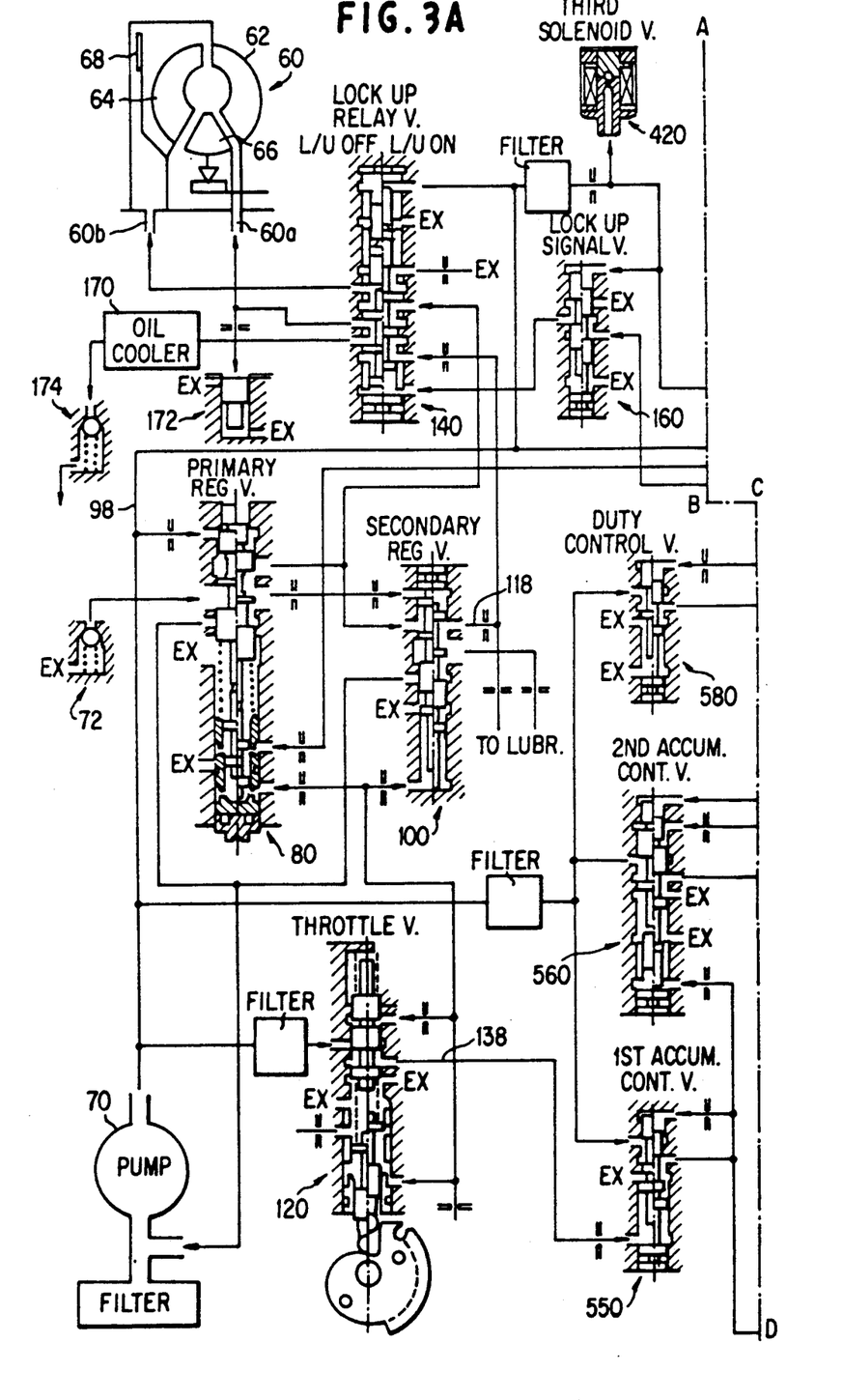
FIGS. 3A-3C a diagram showing an embodiment of a hydraulic control device for an automatic transmission for a vehicle according to the present invention.
Figure 3B:
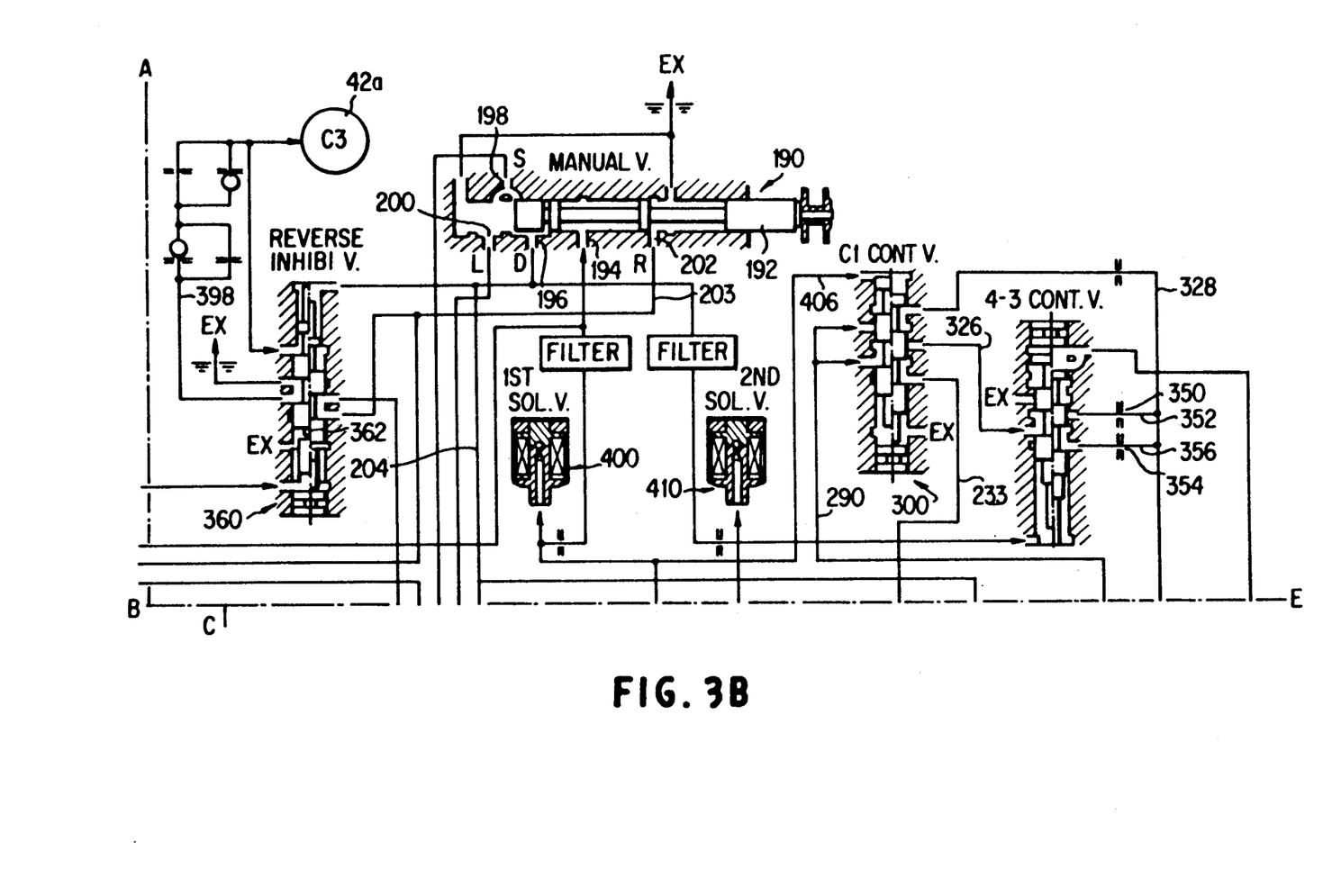
Figure 3C:
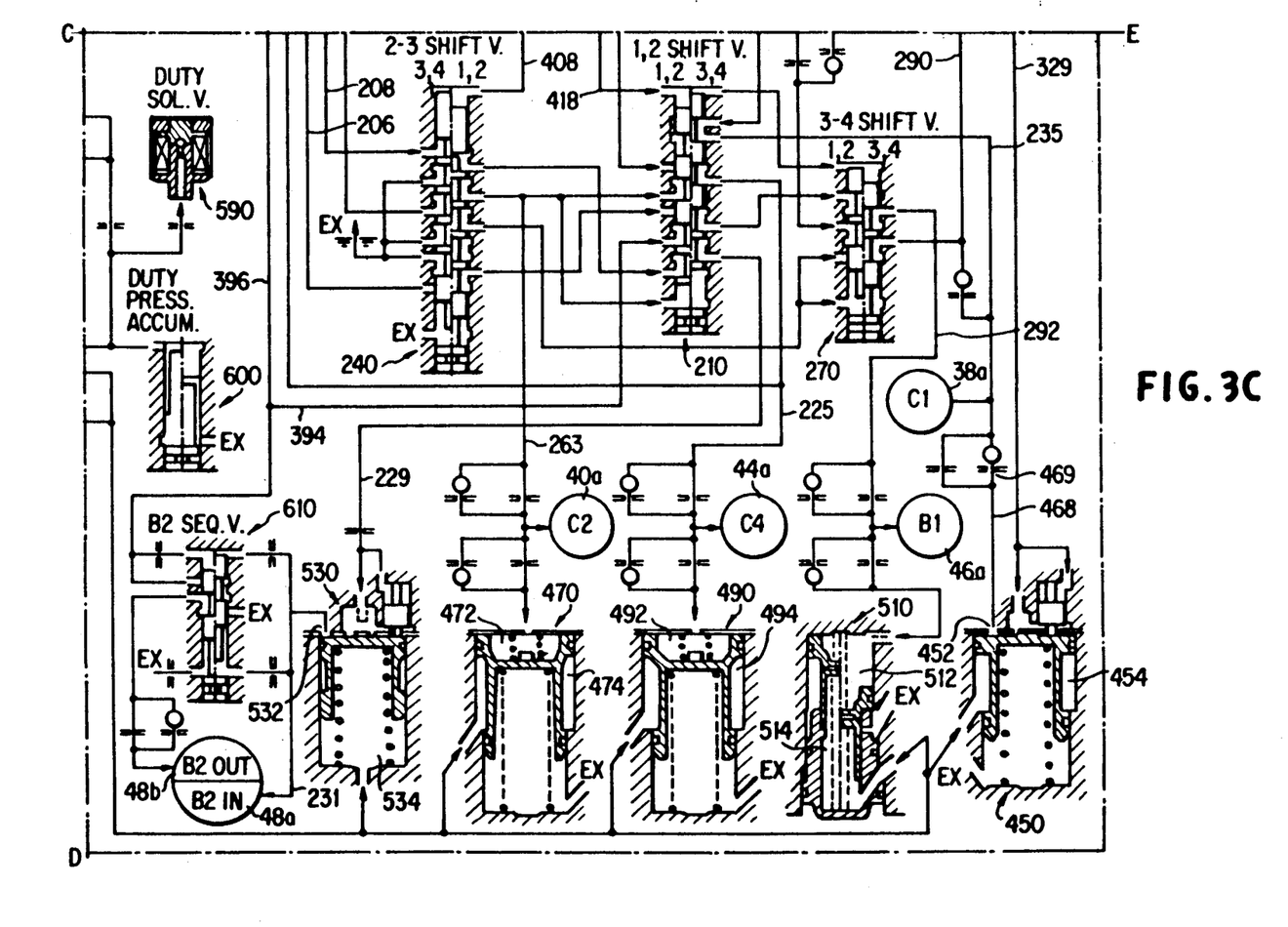

The first clutch 38, the second clutch 40, the third clutch 42, the fourth clutch 44, the first brake 46 and the second brake 48 are all of a hydraulically operating type having, as shown in FIG. 3, hydraulic pressure chambers 38a, 40a, 42a, 46a and 48a plus 48b, respectively, and are adapted to be engaged when a hydraulic pressure is supplied to the hydraulic pressure chambers and are disengaged when the hydraulic pressure has been exhausted from the hydraulic pressure chambers. The supply and the exhaust of the hydraulic pressure to and from these hydraulic pressure chambers are carried out by a hydraulic control device such as shown in FIG. 3.

The input shaft 52 of the above-mentioned planetary gear type speed change device is drivingly connected with a motor such as an internal combustion engine not shown in the figure via a fluid torque converter 60 such as shown in FIG. 3.

The fluid torque converter 60 is of a three elements two phases type comprising a pump impeller 62 drivingly connected with an output member of the motor, a turbine rotor 64 drivingly connected with the input shaft 52 of the planetary gear type speed stage shifting mechanism, and a stator 66 rotatable only in direction. The fluid torque converter 60 further comprises a lockup clutch 68 which is engaged to connect the pump impeller 62 directly with the turbine rotor 64 when a hydraulic pressure is supplied to its port 60a and is disengaged when a hydraulic pressure is supplied to its port 60b. The supply of hydraulic pressure to the ports 60a and 60b is carried out by the hydraulic control device shown in FIG. 3.

The outline of the oil hydraulic control device shown in FIG. 3 will now be described with further reference to FIGS. 4–6.

The oil hydraulic control device comprises a pump 70 which takes in an operating hydraulic fluid such as an oil from a reservoir not shown in the figure and supplies the hydraulic fluid to a primary regulator valve 80 generally called a line pressure control valve and also to a throttle valve 120. The maximum value of the hydraulic pressure supplied by the pump 70 to the primary regulator valve 80 is restricted by a pressure relief valve 72.

The throttle valve 120 provides in a passage 138 a hydraulic pressure which varies in accordance with the load on the engine and is generally called a throttle pressure.

The primary regulator valve 80 is supplied with the throttle pressure and a reverse boost pressure and provides in a passage 98 the line pressure which generally increases along with increase of the throttle opening and a hydraulic pressure for a secondary regulator valve 100 generally called a converter pressure control valve.

The secondary regulator valve 100 is supplied with the throttle pressure and provides a converter pressure (lubricating oil pressure) in a passage 118. The line pressure in the passage 98 is supplied to a port 194 of a manual valve 190. The manual valve 190 has a spool 192 adapted to be operated by a hand of a driver and selectively provides the line pressure supplied to the port 194 at a D port 196 in the so-called D range, also at an S port 198 in the so-called S or 2 range, further at an L port 200 in the so-called L range, and at an R port 202 in the so-called R range.

The line pressure supplied to the D port 196 is conducted through a passage 204 to a D port 214 of a 1-2 shift valve 210, a D port 246 of a 2-3 shift valve 240, and a D port 274 of a 3-4 shift valve 270. The line pressure supplied to the S port 198 is conducted through a passage 206 to an S port 248 of the 2-3 shift valve 240. The line pressure supplied to the L port 200 is conducted through a passage 208 to an L port 250 of the 2-3 shift valve 240. The line pressure supplied to the R port 202 is conducted through a passage 203 to a reverse inhibit valve 360.

Figure 4:
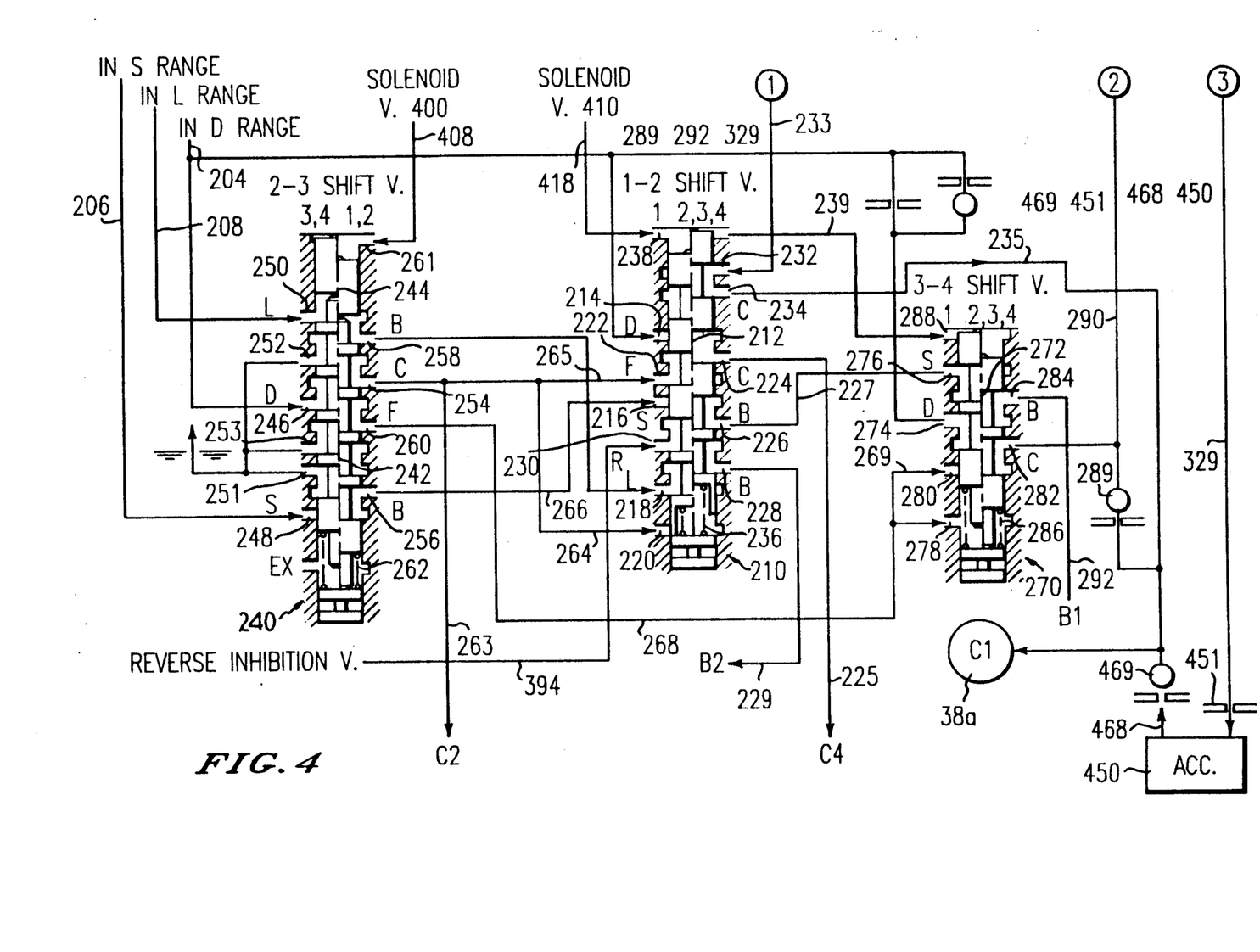
FIGS. 4 and 5 are diagrams showing essential portions of the hydraulic control device according to the present invention.

As shown in FIG. 4 the 2-3 shift valve 240 comprises a spool element 242 and a plug element 244, and in addition to the above-mentioned ports further comprises drain ports 251, 252 and 253, a clutch port 254, brake ports 256 and 258 and a fail safe port 260. When a hydraulic pressure is supplied to a control port 261, the plug element 244 and the spool element 242 are shifted downward in the figure to a descended shift position as shown in the right half portion thereof by overcoming the spring force of a compression coil spring 262 so as to connect the clutch port 254 with the drain port 252, the brake port 256 with the S port 248, the brake port 258 with the L port 250, and the fail safe port 260 with the D port 246, respectively. In contrast, when no hydraulic pressure is supplied to the control port 261, the plug element 244 and the spool element 242 are shifted upward in the figure to an ascended shift position as shown in the left half portion thereof by the spring force of the compressing coil spring 262 so as to connect the clutch port 254 with the D port 246, and the brake ports 256 and 258 and the fail safe port 260 with the drain ports 251, 252 and 252, respectively.

The supply of the hydraulic pressure to the control port 261 is controlled by a first solenoid valve 400.

The clutch port 254 is connected through a passage 263 with the hydraulic pressure chamber 40a of the second clutch 40 and an accumulator chamber 472 of an accumulator 470 for the clutch $C_2$. The clutch port 254 is also connected through a passage 264 with a hold port 220 of the 1-2 shift valve 210, and also through a passage 265 with a fail safe port (drain port) 222 of the 1-2 shift valve 210. The brake port 256 is connected through a passage 266 with the S port 216 of the 1-2 shift valve 210. The brake port 258 is connected through a passage 267 with the L port 218 of the 1-2 shift valve 210. The fail safe port 260 is connected through a passage 268 with a hold port 278 of the 3-4 shift valve 270 and also connected through a passage 269 with a drain port 280 of the 3-4 shift valve 270.

As also shown in FIG. 4, the 1-2 shift valve 210 comprises a spool element 212, and in addition to the above-mentioned ports further comprises a clutch port 224, brake ports 226 and 228, and R port 230, a port 232 and a clutch port 234. When a hydraulic pressure is supplied to a control port 238 the spool element 212 is shifted downward in the figure as shown in the left half portion thereof to a descended shift position by overcoming the spring force of a compression coil spring 236 so as to connect the clutch port 224 with the fail safe port 222, the brake port 226 with the R port 230, and the brake port 228 with the L port 218, while isolating the port 232 from the clutch port 234. In contrast, when no hydraulic pressure is supplied to the control port 238, the spool element 212 is shifted upward as shown in the right half portion thereof in the figure to an ascended shift position by the spring force of the compression coil spring 236 so as to connect the clutch port 224 with the D port 214, the brake port 226 with the S port 216, the brake port 228 with the R port 230, and the port 232 with the clutch port 234.

The supply of the hydraulic pressure to the control port 238 is controlled by a second solenoid valve 410. The control port 238 is connected through a passage 239 with the control port 288 of the 3-4 shift valve 270.

The clutch port 224 is connected through a passage 225 with the hydraulic pressure chamber 44a of the fourth clutch 44 and an accumulator chamber 492 of an accumulator 490 for the clutch $C_4$. The brake port 226 is connected through a passage 227 with the S port 276 of the 3-4 shift valve 270. The brake port 228 is connected through a passage 229 with an accumulator chamber 532 of an accumulator 530 for the brake $B_2$, and is further connected through a passage 231 with the inside hydraulic pressure chamber 48a of the second brake 48. The port 232 is connected through a passage 233 with a port of a $C_1$ control valve 300. The clutch port 234 is connected through a passage 235 with the hydraulic chamber 38a of the first clutch 38.

Also referring to FIG. 4, the 3-4 shift valve 270 comprises a spool element 272, and in addition to the above-mentioned ports further comprises a clutch port 282 and a brake port 284. When no hydraulic pressure is supplied to the hold port 278 while a hydraulic pressure is supplied to the control port 288, the spool element 272 is shifted downward is the figure to a descended shift position as shown in the right half portion thereof by overcoming the spring force of a compression coil spring 286 so as to connect the clutch port 282 with the drain port 280, and the brake port 284 with the D port 274. In contrast, when a hydraulic pressure is supplied to the hold port 278, or when no control pressure is supplied to the control port 288, the spool element 272 is shifted upward in the figure to an ascended shift position as shown in the left half portion thereof in the figure by the hydraulic pressure supplied to the port 278 and/or the spring force of the compression coil spring 286 so as to connect the clutch port 282 with the D port 274, and the brake port 284 with the S port 276.

The clutch port 282 is connected through a passage 290 with the $C_1$ control valve 300. The brake port 284 is connected through a passage 292 with the hydraulic pressure chamber 46a of the first brake 46 and an accumulator chamber 512 of an accumulator 510 for the brake $B_1$.

The first solenoid valve 400 and the second solenoid valve 410 are normally open type valves which open their ports when not energized and close their ports when energized. The manner of energization of these solenoid valves is shown in FIG. 2 in relation with the speed stages to be set up. In FIG. 2 a circle (O) indicates energization of the corresponding solenoid valve.

The first solenoid valve 400 is connected through a passage 408 with the control port 261 of the 2-3 shift valve 240 and is also connected through a passage 406 with a port of the C1 control valve 300.

The second solenoid valve 410 is connected through a passage 418 with the control port 238 of the 1-2 shift valve 210 and further through the passage 239 with the control port 288 of the 3-4 shift valve 270, and still further through a passage 416 with the hold port 340 of the 4-3 control valve 330, so as to supply a hydraulic pressure to the control port 238 and 288 and the hold port 340 when it is energized.

The $C_1$ control valve 300 is a clutch control valve for controlling the engaging speed of the first clutch 38. In more detail, as shown in FIG. 5, the $C_1$ control valve 300 has a spool element 302 adapted to be shifted between an ascended shift position as shown in a left half portion thereof in the figure under the spring force of a compression coil spring 316 when no hydraulic pressure is supplied to a control port 314 so as to interrupt connection between ports 304 and 308 and connection between ports 306 and 312 while connecting the port 306 with a port 310 and a descended shift position as shown in the right half portion thereof in the figure against the spring force of the compression coil spring 316 when the control port 314 is supplied with a hydraulic pressure so as to connect the port 304 with the port 308 and the port 306 with the port 312.

As described above, the port 312 is connected through the passage 233 with the port 232 of the 1-2 shift valve 210, while the port 308 is connected through a passage 328 throttled at a part thereof by an orifice 327, a passage 329 and an orifice 451 with an accumulator chamber 452 of an accumulator 450 for the clutch $C_1$, and further through a passage 468 and a one way valve 469 with the hydraulic pressure chamber 38a of the first clutch 38. The port 310 is connected through a passage 324 throttled at a part thereof by an orifice 325 with the passage 329, and is also connected through a passage 326 with a port 334 of a 4-3 control valve 330.

Figure 5:
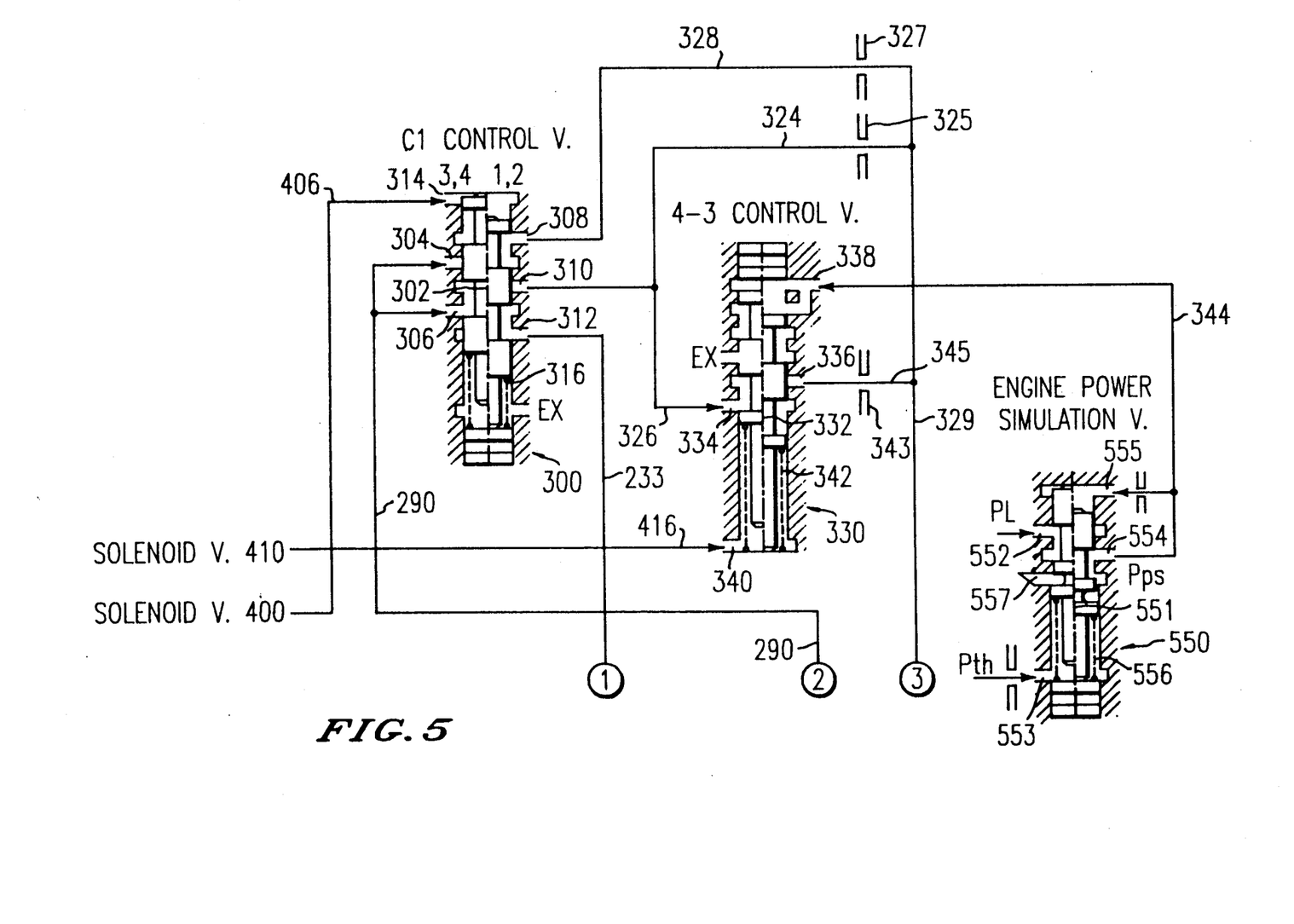

The 4-3 control valve 330 has, as shown in FIG. 5, a spool element 332 adapted to be movable between an ascended position shown in a left half portion thereof in the figure when a hold port 340 is supplied with a hydraulic pressure and a descended position as shown in a right half portion thereof in the figure against the spring force of a compression coil spring 342 when a control port 338 is supplied with a hydraulic pressure so as to interrupt connection between ports 334 and 336. The spool element 332 is in the ascended position as shown in the left half portion thereof in the figure when neither the port 340 nor the port 338 are supplied with a control hydraulic pressure, so that the port 334 is connected with the port 336. The control port 338 is connected through a passage 344 with an engine power simulation valve 550 so as to be supplied with an engine power simulation hydraulic pressure which varies in accordance with the throttle opening to simulate engine out put power. The port 336 is connected through a passage 345 having an orifice 343 with the passage 329.

The hydraulic pressure chamber 38a of the first clutch 38 is connected with the clutch port 282 of the 3-4 shift valve 270 through a one way valve 289 to be quickly exhausted to the hydraulic pressure therefrom. The throttling ratio of the orfice 343 is set to be smaller than that of the orifice 325.

The reverse inhibition valve 360 is supplied with the line pressure from the R port 202 of the manual valve 190 through a passage 203, and is switched over according to opening or closing of the third solenoid valve 420 so as to be at an inhibition position where a spool 362 is shifted up as shown in a left half portion thereof when the vehicle is running forward at a speed greater than a predetermined value and to be in a non inhibit position where the spool element 362 is shifted down as shown in the right half portion thereof during other operating conditions while allowing the line pressure from the passage 203 to flow to the passage 398 toward the hydraulic pressure chamber 42a of the third clutch 42, to the passages 396 and 394 toward the R port 230 of the 1-2 shift value 210, and also to the passage 396, a $B_2$ sequence valve 610 and the passage 392 toward the outside hydraulic pressure chamber 48b of the second brake 48.

The $B_2$ sequence valve 610 operates in response to the hydraulic pressure in the inside hydraulic pressure chamber 48a of the second brake 48 so as to connect the passage 396 with the passage 392 so that the outside hydraulic pressure chamber 48b is supplied with the hydraulic pressure when the hydraulic pressure in the inside hydraulic pressure chamber 48a is greater than a predetermined value.

Accumulator 450, 470, 490, 510 and 530 are back pressure control type accumulators having back pressure chambers 454, 474, 494, 514 and 534, respectively. The hydrualic pressure supplied to these back pressure chambers is controlled by an accumulator control valve 560.

The accumulator control valve 560 is supplied with a duty hydraulic pressure from the engine power simulation valve 550 to change its output pressure.

The duty solenoid valve 590 is supplied with a pulse signal having a determinate duty ratio and cyclically opens and closes according to the duty ratio so as to control a modulate hydraulic pressure from a duty control valve 580 according to the duty ratio. The duty hydraulic pressure controlled by the duty solenoid valve 590 for the second accumulator control valve 560 is rectified of its pulses by a duty pressure accumulator 600.

The engine power simulation valve 550 has, as shown in FIG. 5, a spool element 551, an input port 552 supplied with the line hydraulic pressure from the primary regulator valve 80, that is, the line hydraulic pressure control valve, a signal port 553 supplied with the throttle hydraulic pressure from the throttle valve 120, an output port 554 for outputting an engine power simulation hydraulic pressure, a feed back port 555 supplied with the hydraulic pressure from the output port 554, and a drain port 557. The spool element 551 moves up and down according to the balance between the downward biasing force generated by the hydraulic pressure supplied to the feed back port 555 and the upward biasing force generated by the throttle hydraulic pressure supplied to the signal port 553 and the spring force of a compression coil spring 556 so as to control the degree of connection between the input port 552 and the output port 554 so that a hydraulic pressure simulating engine output power as described hereinunder is generated at the output port 554.

By denoting a pressure receiving area of the spool element 551 exposed to the hydraulic pressure supplied to the feed back port 555 by $A_1$, a pressure receiving area of the spool element exposed to the throttle hydraulic pressure Pth by $A_2$, the spring force applied by the compression coil spring 556 to the spool element 551 by $F_1$, the pressure Pps generated at the port 554 is expressed by the following formula:

$$Pps = (A_2 \cdot Pth + F_1)/A_1$$

Figure 6:
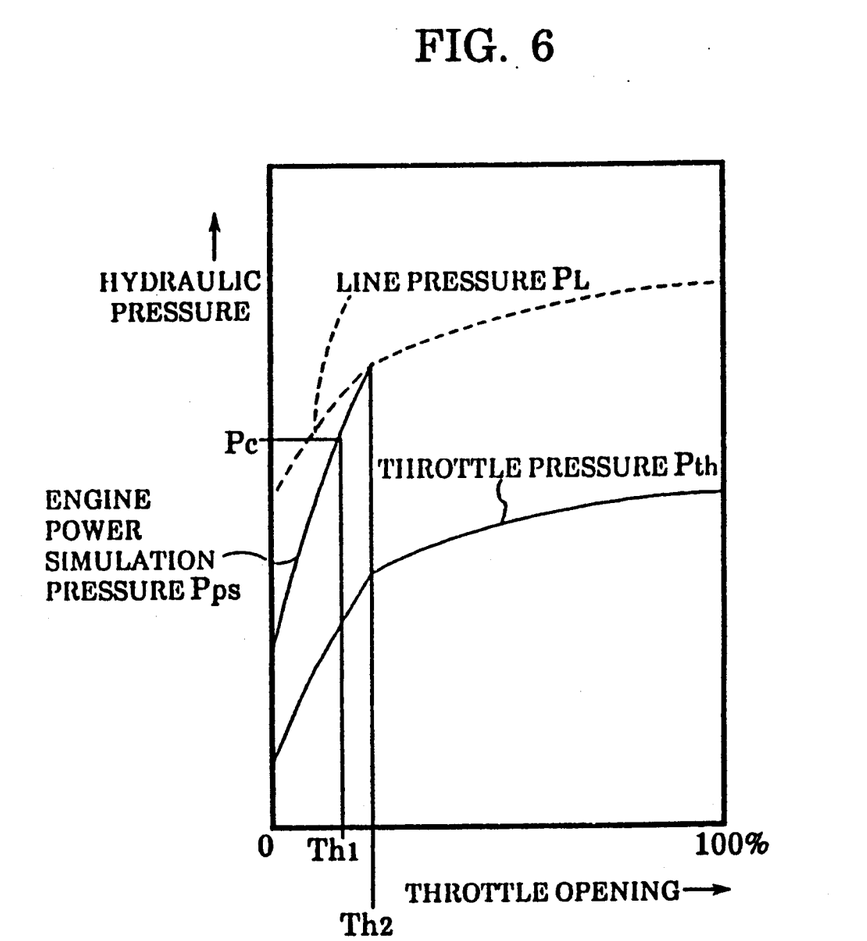
FIG. 6 a graph showing the characteristic changes of the line pressure, the throttle pressure and the engine power simulation pressure relative to the throttle opening.

Since the pressure Pps is modulated from the line hydraulic pressure PL, when the throttle hydraulic pressure Pth is above a certain value, that is, when the throttle opening is greater than a certain value $Th_2$ as shown in FIG. 6, the Pressure Pps is equal to the line hydraulic pressure PL. However, when the throttle opening is less than the value $Th_2$, the pressure Pps increases or decreases at a higher rate than the line hydraulic pressure along with increase or decrease of the throttle opening, provided that the area $A_2$ is larger than the area $A_1$ as shown schematically in FIG. 6. The throttle pressure is generally designed to correspond to engine output power in as a wide range thereof as possible, and therefore the rate of increase or decrease of the throttle pressure relative to increase or decrease of engine output power is generally to small in a region of small engine output power as viewed in a diagram such as FIG. 6 showing the pressure level of the throttle pressure along an ordinate relative to the throttle opening along an abscissa, the inclination of a curve of the throttle pressure is too small to faithfully simulate engine output power in a region of low throttle opening. By modifying the line pressure by the throttle pressure in the above-mentioned manner, a hydraulic pressure such as the pressure Pps is obtained so as more faithfully simulate the engine output power relative to the throttle opening. Thus the pressure Pps is herein called the engine power simulation pressure.

The above-mentioned $Th_2$ of the throttle opening on the lower side of which the pressure Pps changes at a higher rate relative to the throttle opening than the line hydraulic pressure can be optionally adjusted by the spring force of the compression coil spring 556, and the value of $Th_2$ is set to be larger than a value $Th_1$ at which the pressure Pps shows a determinate value Pc which is a desired pressure level for switching over the 4-3 control valve as described hereinunder.

The engine power simulation pressure Pps generated at the output port 554 of the engine power simulation valve 550 is supplied through the passage 344 to the control port 338 of the 4-3 control valve 330 and is also supplied to the accumulator control hydraulic value 560 as an accumulator control hydraulic pressure.

The supply of the converter pressure to the ports 60a and 60b of the fluid torque converter 60 is controlled by a lock up relay valve 140.

The lock up relay valve 140 is switched over according to a selective supply of a hydraulic pressure from a lock up signal valve 160. The lock up relay valve 140 supplies oil toward an oil cooler 170. The hydraulic pressure in the passage including the oil cooler 170 is limited by a cooler by-pass valve 172 and a relief valve 174.

The lock up signal valve 160 is supplied with a hydraulic pressure from the clutch port 224 of the 1-2 shift valve 210 and is switched over in accordance with on and off of the third solenoid valve 420 so as to supply the hydraulic pressure supplied from the clutch port 224 to the lock up relay valve 140 and to engage the lock up clutch 68 when the third solenoid valve 420 is energized.

The third solenoid valve 420 is selectively energized as shown in FIG. 2 for inhibiting engagement of the lock up clutch 68 in the reverse stage when the manual shift valve is shifted to the R range and when the manual shift valve is sifted to the D range.

The operation of the hydraulic control device according to the present invention will now be described principally with respect to the speed change operation in the D range.

First, the operation in the first speed stage will be described. In the first speed stage the first solenoid valve 400 and the second solenoid valve 410 are both energized, and therefore the control port 261 of the 2-3 shift valve 240, the control port 238 of the 1-2 shift valve 210 and the control port 288 of the 3-4 shift valve 270 are supplied with the hydraulic pressure. Therefore, the plug element 244 and the spool element 242 of the 2-3 shift valve 240 are shifted to the descended shift position shown in the right half portion thereof, and the spool element 212 of the 1-2 shift valve 210 is shifted to the descended shift position shown in the left half portion thereof. Therefore, the line pressure from the D port 196 of the manual shift valve 190 is supplied through the passage 204, the D port 246 of the 2-3 shift valve 240, the fail safe port 260, and the passage 268 to the hold port 278 of the 3-4 shift valve 270. The 3-4 shift valve 270 is supplied with the hydraulic pressure at the control port 288. However, since the hold port 278 is also supplied with the hydraulic pressure, the spool element 272 is shifted to the ascended shift position shown in the left half portion thereof by the spring force of the compression coil spring 286.

Thus the D port 274 is connected with the clutch port 282, and therefore the line hydraulic pressure supplied from the D port 196 of the manual shift valve 190 is supplied through the passage 290 to the port 304 and 306 of the $C_1$ control valve 300. Since at this time the control port 314 of the $C_1$ control port 300 is supplied with the hydraulic pressure, the spool element 302 of the $C_1$ control valve 300 is positioned in the lowered position as shown in the right half portion thereof in the figure, connecting the port 304 with the port 308 and the port 306 with the port 312, and therefore the hydraulic pressure supplied to the port 304 and 306 is conducted through the passages 328 and 233. At this time the spool element 212 of the 1-2 shift valve 210 is shifted to the descended shift position as shown in the left half portion thereof in the figure, with the port 232 being obstructed, so that the hydraulic pressure is conducted through the passage 328 and the orifice 327 to the passage 329, and then through the orifice 451, the accumulator chamber 452 of the accumulator 450 for the $C_1$ clutch, the passage 468, the one way valve 469 to the hydraulic pressure chamber 38a of the first clutch 38 to engage it. Since the throttling ratio of the orifice 327 is smaller than that of the orifices 325 and 343, the supply of the hydraulic pressure to the pressure chamber 38a is carried out relatively quickly, so that the first clutch 38 is relatively quickly engaged to set up the first speed stage in the D range.

Next, the second speed stage will be described. In this speed stage the first solenoid valve 400 is only energized, so that the control port 261 of the 2-3 shift valve 240 only is still supplied with the hydraulic pressure. Therefore, the plug element 244 and the spool element 242 of the 2-3 shift valve 240 remains in the descended shift position, whereas the spool element 212 of the 1-2 shift valve 210 is shifted to the ascended shift position shown in the right half portion thereof by the spring force of the compression coil spring 236. In the 3-4 shift valve 270 the hydraulic pressure in the control port 288 disappears and the spool element 272 still remains at the ascended shift portion shown in the left half portion thereof by the hydraulic pressure supplied to the hold port 278 and the spring force of the compression coil spring 286. By the shifting over of the 1-2 shift valve 210 the D port 214 is now connected with the clutch port 224 so that the line pressure from the D port 196 of the manual shift valve 190 is supplied through the passage 225 to the hydraulic pressure chamber 44a of the fourth clutch 44 which is then engaged. Thus the first clutch 38 and the fourth clutch 44 are engaged, thereby setting up the second speed stage of the D range.

In this stage, by the shifting of the spool element 212 of the 1-2 shift valve 210 upward in the figure the port 232 is connected with the clutch port 234, and the hydraulic pressure from the port 312 is conducted through the passage 235 directly to the hydraulic pressure chamber 38a of the first clutch 38. However, since the hydraulic pressure chamber 38a has already been supplied with the hydraulic pressure of the same pressure level as the above-mentioned hydraulic pressure, the engaging condition of the first clutch 38 does not change.

Next, the third speed stage will be described. In this speed stage the first solenoid valve 400 and the second solenoid valve 410 are both not energized, so that the control port 238 of the 1-2 shift valve 210 and the control port 261 of the 2-3 shift valve 240 are both not supplied with hydraulic pressure. Therefore, the plug element 244 and the spool element 242 of the 2-3 shift valve 240 are lifted to the ascended shift position as shown in the left half portion in the figure by the spring force of the compression coil spring 262, whereby the D port 246 of the 2-3 shift valve 240 is isolated from the fail safe port 260 thereof and is connected with the clutch port 254. Thus the line pressure from the D port 196 of the manual shift valve 190 is conducted through the passage 263 to the hydraulic pressure chamber 40a of the second clutch 40 which is then engaged. In the 3-4 shift valve 270, although the hold port 278 is no longer supplied with the hydraulic pressure, the spool element 272 still remains in the ascended second shift position by the spring force of the compression coil spring 286. In the 1-2 shift valve 210, the spool element 212 remains in the ascended shift position as in the second speed stage. Therefore, in addition to the first clutch 38 and the fourth clutch 44 the second clutch 40 is now engaged, thereby setting up the third speed stage of the D range.

In the third speed stage the spool element 302 of the $C_1$ control valve 300 is positioned in its ascended position as shown in the left half portion thereof in the figure under no energization of the first solenoid valve 400, so that the ports 304 and 312 are closed while only the port 306 is connected with the port 310. Therefore, the hydraulic supply passage to the first clutch 38 is thus switched over. However, since the pressure level of the hydraulic pressure supplied to the hydraulic pressure chamber 38a is the same, the engaging condition of the first clutch 38 does not change.

Next, the fourth speed stage will be described. In this speed stage the second solenoid valve 410 only is energized. Therefore, the control port 238 of the 1-2 shift valve 210 and the control port 288 of the 3-4 shift valve 270 are supplied with the hydraulic pressure. In the 1-2 shift valve 210 the hold port 220 is supplied with the hydraulic pressure from the clutch port 254 of the 2-3 shift valve 240 through the passage 264. Therefore, in spite of the supply of the hydraulic pressure to the control port 238 the spool element 212 remains in the ascended shift position shown in the right half portion thereof by the spring force of the compression coil spring 236. However, in the 3-4 shift valve 270, since the hold port 278 is connected through the passage 268 and the fail safe port 260 of the 2-3 shift valve 240 to the drain port 253, the spool element 272 is shifted downward to the descended position by the hydraulic pressure supplied to the control port 288 by overcoming the spring force of the compression coil spring 286. Therefore, the D port 274 is connected with the brake port 284 instead of the clutch port 282 which is now connected to the drain port through the port 280. Thus the hydraulic pressure chamber 38a of the first clutch 38 is now exhausted of the hydraulic pressure, and the first clutch 38 is disengaged. Instead the line pressure is supplied to the hydraulic pressure chamber 46a of the first brake 46 which is now engaged. Therefore, the second clutch 40, the fourth clutch 44 and the first brake 46 are engaged, thereby setting up the overdrive fourth speed stage of the D range.

When the transmission is shifted down from the fourth speed stage to the third speed stage under relatively high engine output, that is a kick down from the fourth speed stage to the third speed stage, the spool element 302 of the $C_1$ control valve 300 is still positioned at its ascended position as shown in the left half portion thereof in the figure, and therefore the port 306 only is connected with the port 310, so that the hydraulic pressure from the clutch port 282 of the 3-4 shift valve 270 is supplied through the passage 290, the ports 306 and 310 to the passages 324 and 326. In this state, since it is a downshifting under a substantial depression of the accelerator pedal, the throttle opening is so large as to be greater than the determinate value $Th_1$, so that the engine power simulation pressure Pps generated by the engine power simulation valve 550 is greater than the determinate value Pc. Thus, in this state, in the 4-3 control valve 330 the spool element 332 is shifted down to the descended position as shown in the right half portion thereof in the figure under the pressure supplied to the port 338 against the compressing coil spring 342, thereby interrupting the connection between the port 334 and the port 336. Therefore, the hydraulic pressure at the port 310 is conducted only through the passage 324 having the throttling orifice 325 toward the passage 329 and then through the throttling orifice 451, the accumulator 450 for the clutch $C_1$, the passage 468, and the one way valve 469 to the hydraulic pressure chamber 38a of the first clutch 38.

In this state, therefore, the engagement of the first clutch 38 is carried out relatively slowly as determined by the throttling ratio of the orifices 325 and 451 and the accumulator characteristic of the accumulator 450 for the clutch $C_1$. Thus, in the kick down downshifting from the fourth speed stage to the third speed stage, it is avoided that the first clutch 38 is engaged too early before the one way clutch 34 is engaged as a result of rising up of the engine rotational speed, so that the speed stage shifting is completed with no substantial speed shifting shock to occur.

In the downshifting from the fourth speed stage to the third speed stage under less or non engine driving such as by the prohibition of the overdrive stage, since the throttle opening is relatively small so as to be less than the determinate value $Th_1$, the engine power simulation pressure Pps supplied to the control port 338 of the 4-3 control valve 330 is relatively low, so that the spool element 332 of the 4-3 control valve 330 is in its ascended position as shown in the left half portion thereof in the figure under the spring force of the compression coil spring 342, thereby communicating the port 334 with the port 336. In this state, the hydraulic pressure is supplied through the passage 324 and also through the passage 345 to the passage 329, and therefore the hydraulic pressure chamber 38a of the first clutch 38 is supplied with the hydraulic pressure at a higher speed than in the case where the hydraulic pressure is supplied only through the passage 324, so that the first clutch 38 is relatively quickly engaged as compared with the kick down downshifting from the fourth speed stage to the third speed stage. In the downshifting under such less or non engine driving the first one way clutch 34 does not quickly get into its engagement because of slow or non rising of the engine rotational speed, and therefore if the engagement of the first clutch 38 is delayed, there may occur an inertial running condition as if under the running at the neutral shift position during the speed stage shifting. However, by the first clutch 38 being relatively quickly engaged as described above, the inertial running condition is avoided and the normal engine connected drive feeling is available.

As described above, the switching over operation of the 4-3 control valve 330 is controlled by the throttle opening traversing the value $Th_1$ corresponding to the determinate engine power simulation pressure Pc. In this operational region the engine power simulation pressure Pps changes at a high rate relative to the throttle opening, and therefore even when the switching over pressure value Pc of the 4-3 control valve 330 is somewhat unstable, the value of the throttle opening at which the switching over operation is triggered does not change much so as to be within a required tolerance.

In a kick down from the fourth speed stage to the second speed stage the spool element 302 in the $C_1$ control valve 300 is shifted down in the figure as shown in the right half portion thereof in the figure by the supply of the hydraulic pressure to the control port 314 under the energization of the first solenoid valve 400, thereby connecting the port 304 with the port 308 and the port 306 with the port 312. In this state the spool element 212 of the 1-2 shift valve 210 is positioned in the ascended position as shown in the right half portion thereof in the figure, with the port 232 being connected with the port 234, so that the hydraulic pressure from the port 312 of the $C_1$ control valve 300 is supplied through the passage 233, the port 232, the port 234 and the passage 235 to the hydraulic pressure chamber 38a of the first clutch 38 without passing through the accumulator, and thus the first clutch is immediately engaged. Therefore, it is ensured that the first clutch 38 is engaged before the second clutch 40 is completely disengaged. Thus, it is avoided that the engine rotational speed abnormally revs up during the downshifting, and the downshifting is carried out in good condition with no substantial speed stage shifting shock.

Although the invention has been described with respect to a particular embodiment thereof, it will be clear to those skilled in the art that the present invention is not limited to the shown embodiment and various embodiments are possible within the scope of the present invention.

TABLE 1

| | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | 0 | | | | | (0) | 0 | 0 |
| 2nd Speed Stage | 0 | | | 0 | (0) | | | 0 |
| 3rd Speed Stage | 0 | 0 | | 0 | | | 0 | |
| 4th Speed Stage | | 0 | | 0 | 0 | | | |
| Reverse Stage | | | 0 | | | 0 | | |

TABLE 2

| | Speed Change Gear Ratio |
|---|---|
| 1st Speed Stage | $(1 + r_2)/r_2$ |
| 2nd Speed Stage | $\{(1 + r_2)/r_2\} - \{1/r_2(1 + r_1)\}$ |
| 3rd Speed Stage | 1 |
| 4th Speed Stage | $1/(1 + r_1)$ |
| Reverse Stage | $-1/r_1$ |

We claim:

1. In an automatic transmission for a vehicle such as an automobile having a speed stage shifting mechanism including parallelly arranged first and second hydraulically operated input clutches and adapted to provide a certain first speed stage in which said first and second input clutches are both engaged and a certain second speed stage higher than said first speed stage in which said first input clutch is disengaged and said second input clutch is engaged, the engagement of said first input clutch in said first speed stage being not essential unless engine brake availability is required, a hydraulic control device comprising a switching over valve variably operable according to an input signal representing engine output power so as to switch over supply of a hydraulic pressure to said first input clutch between a first mode of relatively slowly supplying said hydraulic pressure to said first input clutch and a second mode of relatively quickly supplying said hydraulic pressure to said first input clutch according to whether engine output power is higher than a determinate power level or less than said determinate power level, respectively.

2. A hydraulic control device according to claim 1, further comprising an engine power simulation valve for modulating a line hydraulic pressure available in said hydraulic control device in accordance with a throttle hydraulic pressure available in said hydraulic control device so as to generate an engine power simulation hydraulic pressure which increases or decreases at higher rate along with increase or decrease of said throttle hydraulic pressure than said line hydraulic pressure in a low pressure level region of said throttle hydraulic pressure including a certain pressure level of said throttle hydraulic pressure corresponding to said determinate power level of engine output power, said determinate power level of engine output power being determined based upon said engine power simulation hydraulic pressure.

3. A hydraulic control device according to claim 1, wherein said certain second speed stage is an overdrive stage, and said automatic transmission is shifted down from said certain second speed state to said certain first speed stage according to said second mode when said overdrive stage is inhibited.

4. A hydraulic control device according to claim 1, wherein said automatic transmission is shifted down from said certain second speed stage to said certain first speed stage according to said first mode by kickdown.

5. In an automatic transmission for a vehicle such as an automobile having a speed stage shifting mechanism including parallelly arranged first and second hydraulically operated input clutches and adapted to provide a certain first speed stage in which said first and second input clutches are both engaged and a certain second speed stage higher than said first speed stage in which said first input clutch is disengaged and said second input clutch is engaged, the engagement of said first input clutch in said first speed stage being not essential unless engine brake availability is required, a hydraulic control device fluidically connected to said first input clutch for supplying hydraulic pressure thereto, said hydraulic control device comprising a switch over valve having switch over means for switching between a first mode in which hydraulic pressure is slowly supplied to said first input clutch and a second mode in which hydraulic pressure is supplied to said first input clutch at a rate quicker than in said first mode, said switch over valve including means for receiving an engine output power signal, wherein said switch over means switches between said first and second modes as a function of a value of said engine output power signal such that said switch over valve is in said first mode when said engine output power signal is higher than a determinate value and in said second mode when said engine output power signal is lower than said determinate valve.

6. A hydraulic control device according to claim 5, including a shift valve for shifting between said certain first speed stage and said certain second speed stage and comprising means for supplying said hydraulic pressure to said hydraulic control device.

* * * * *